US00RE40182E

(19) United States
(12) Reissued Patent
Morrow

(10) Patent Number: US RE40,182 E
(45) Date of Reissued Patent: Mar. 25, 2008

(54) LACROSSE HEAD

(75) Inventor: David Morrow, Metamora, MI (US)

(73) Assignee: Warrior Sports, Inc., Warren, MI (US)

(21) Appl. No.: 10/154,128

(22) Filed: May 23, 2002

Related U.S. Patent Documents

Reissue of:
(64) Patent No.: 6,066,056
Issued: May 23, 2000
Appl. No.: 08/920,915
Filed: Aug. 29, 1997

(51) Int. Cl.
*A63B 65/12* (2006.01)
*A63B 59/02* (2006.01)

(52) U.S. Cl. ..... 473/513
(58) Field of Classification Search ..... 473/513, 473/512, 514, 471; D21/724
See application file for complete search history.

(56) References Cited

U.S. PATENT DOCUMENTS

| | | | | |
|---|---|---|---|---|
| 346,751 A | | 8/1886 | Hillman | |
| 364,596 A | | 6/1887 | Luce | |
| 891,813 A | | 6/1908 | Ceel | |
| 1,459,389 A | * | 6/1923 | Brown | 473/513 |
| 1,877,820 A | | 9/1932 | Costello | |
| 2,039,138 A | | 4/1936 | Auer | |
| 2,142,527 A | | 1/1939 | Pool | |
| 2,508,519 A | | 5/1950 | Jay | |
| 2,596,894 A | | 5/1952 | Frisch | |
| 3,086,777 A | | 4/1963 | Lacosta | |
| 3,306,960 A | | 2/1967 | Weissman | |
| 3,473,806 A | | 10/1969 | Patterson | |
| 3,507,495 A | * | 4/1970 | Fracalossi et al. | 473/513 |
| 3,591,178 A | | 7/1971 | Milligan et al. | |
| 3,644,168 A | | 2/1972 | Bonk et al. | |
| 3,702,702 A | | 11/1972 | Hoult | |
| 3,788,941 A | | 1/1974 | Kupits | |
| 3,822,062 A | * | 7/1974 | Tucker et al. | 473/513 |
| D236,737 S | | 9/1975 | Brine | |
| 3,905,088 A | | 9/1975 | Tucker et al. | |
| 3,910,578 A | | 10/1975 | Brine, Jr. | |
| 3,934,876 A | | 1/1976 | Haddad | |

(Continued)

FOREIGN PATENT DOCUMENTS

| | | | |
|---|---|---|---|
| CA | 1273662 A | * | 9/1990 |
| CA | 2322830 | | 9/1999 |

OTHER PUBLICATIONS

Brine Lacrosse Catalog, 1998 Edition, p. 19, Published in United States.
Brine Lacrosse Catalog, 1999 Edition, p. 7, Published in United States.
STX Lacrosse Catalog, 1999–2000 Edition, p. 19, Published in United States.
STX Lacrosse Catalog 2000, Lacrosse Head.
STX Lacrosse Catalog 2000, Heads.
Brine Catalog 2000 Lacrosse Heads.
American Indian Lacrosse Little Brother of War, 1994.
Excerpt from Brine Catalog re: OZ lacrosse head.
Excerpt from Brine Catalog re: Edge lacrosse head.
Excerpt from deBeer Catalog re: Shockwave lacrosse head.

*Primary Examiner*—Eugene Kim
*Assistant Examiner*—M. Chambers
(74) *Attorney, Agent, or Firm*—Dickinson Wright PLLC

(57) ABSTRACT

An improved head for a lacrosse stick having ridges extending along the exterior surface of the lip and depressions extending inwardly from the interior surface of the lip adapted to protect the lacings from abrasive contact with the ground and the ball. The ridges flank each aperture on the lip through which the lacings are thread. The depressions abut each aperture on the lip and are recessed from the apertures to the backlip portion. Ball retaining ridges extend along the interior surface of the sidewalls and serve to direct and retain the ball within the ball pocket.

62 Claims, 2 Drawing Sheets

U.S. PATENT DOCUMENTS

| | | | | | |
|---|---|---|---|---|---|
| 4,022,477 | A | | 5/1977 | Pool | |
| 4,034,984 | A | * | 7/1977 | Crawford et al. | 473/513 |
| 4,037,841 | A | | 7/1977 | Lewis, Jr. | |
| 4,138,111 | A | * | 2/1979 | Rule | 473/513 |
| 4,358,117 | A | * | 11/1982 | Deutsch | 473/513 |
| D273,601 | S | * | 4/1984 | Lewis et al. | D21/724 |
| 4,657,260 | A | * | 4/1987 | Brine, Jr. | 473/513 |
| D297,963 | S | * | 10/1988 | Tucker et al. | D21/724 |
| 4,940,243 | A | * | 7/1990 | Tucker et al. | 473/513 |
| D318,509 | S | * | 7/1991 | Naumburg, Jr. | D21/724 |
| 5,035,434 | A | * | 7/1991 | Taylor et al. | 473/513 |
| 5,037,112 | A | * | 8/1991 | Brine et al. | 473/513 |
| 5,048,843 | A | * | 9/1991 | Dorfi et al. | 473/513 |
| 5,054,790 | A | * | 10/1991 | Brine et al. | 473/513 |
| 5,067,726 | A | * | 11/1991 | Brine et al. | 473/513 |
| 5,080,372 | A | * | 1/1992 | Brine et al. | 473/513 |
| D331,086 | S | * | 11/1992 | Brine et al. | D21/724 |
| 5,174,580 | A | * | 12/1992 | Pratt | 473/513 |
| 5,269,532 | A | * | 12/1993 | Tucker et al. | 473/513 |
| 5,290,039 | A | * | 3/1994 | Cornelio | 473/513 |
| D350,999 | S | * | 9/1994 | Chen | D21/724 |
| 5,494,297 | A | * | 2/1996 | MacNeil | 473/513 |
| 5,566,947 | A | * | 10/1996 | Tucker et al. | 473/513 |
| 5,568,925 | A | * | 10/1996 | Morrow et al. | 473/513 |
| D376,183 | S | * | 12/1996 | Morrow et al. | D21/724 |
| 5,651,549 | A | * | 7/1997 | Dill et al. | 473/513 |

* cited by examiner

LACROSSE HEAD

Matter enclosed in heavy brackets [ ] appears in the original patent but forms no part of this reissue specification; matter printed in italics indicates the additions made by reissue.

TECHNICAL FIELD

The present invention relates to a head for a lacrosse stick having apparatus along the lip to protect the web laces from premature wearing and a ball retention apparatus along the sidewalls to help keep the ball in the pocket during play.

BACKGROUND ART

Current lacrosse heads typically include an open frame with a base having a concave interior surface, a pair of sidewalls that diverge from the base, and a lip that interconnects the sidewalls remotely to the base. Openings or other means are formed through the frame for securing a lacrosse net around the back side of the frame, leaving the opposing front side for receiving lacrosse balls.

A frequent problem which occurs with lacrosse heads is the wearing of the laces. During play, the lip portion of the head comes in contact with the ground when scooping up the ball from the ground, causing the laces to wear out. U.S. Pat. No. 4,358,117, issued Nov. 9, 1982, to Deutsch, describes a lacrosse head which provides pairs of raised ridges along the outer surface of the lip. Each pair of raised ridges extends from opposed sides of circular shaped openings to accommodate the lacings and protect the lacings from abrasive contact with the ground. The lace holes disclosed in Deutsch are circular, which can cause difficulty in stinging flat rectangular laces or produces a too loosely strung web. Additionally, Deutsch does not address the problem of lace wear resulting from contact of the inner surface of the lip with the lacrosse ball.

Another concern of lacrosse players is the facility of the lacrosse head to assist in retention of the ball therein, particularly when running or being checked. Frames of lacrosse sticks are commonly made of plastic to lighten the weight of the frame. Plastic frames can cause a loss of rigidity when it comes to ball retention. U.S. Pat. No. 5,080,372 issued Jan. 14, 1992, to Brine III et al, discloses a lacrosse stick head with a pair of elongated ribs disposed proximate the upper edges of the sidewalls and extending towards each other in a plane slightly overlying the ball pocket. Although these ribs are said to facilitate easier retention of a ball in the netting, projection of the ribs normal to the interior of the head does little to control the bounce of the ball into the pocket because of the very slight overlap of the ribs with respect to the pocket.

Additionally, since Brine III's ribs are continuous and extend along virtually the entire length of the sidewall, these lacrosse heads require extra material for the ribs, adding to the weight and cost of the lacrosse head. It is thus a problem to design a ball retention apparatus that is both light weight and cost effective and that does not compromise ball retention. It is desirable to configure a rib which will direct the ball towards the center of the pocket for better retention when the player is running or being checked and also to place the ball in a better position for shooting the ball.

SUMMARY OF THE INVENTION

The present invention is directed to overcoming one or more of the problems as set forth above. It is an object of the present invention to provide an improved lacrosse head which provides protection for the lacings from wear due to contact with the ground and the ball while scooping the ball during play.

A further object of the present invention is to provide an improved lacrosse head which directs the ball toward the ball pocket into an immediate shooting position and to keep it there during play.

Another object of the present invention is to provide an improved lacrosse head with sidewalls having increased rigidity.

It is an object of the present invention to provide an improved lacrosse head with improved ball retention capabilities while decreasing the amount of material required to provide such capabilities.

Yet another object of the present invention is to provide an improved lacrosse head which provides a better fit for the laces.

According to the present invention, the foregoing and other objects are attained by providing an improved lacrosse head which protects the web laces from unnecessary wear and also helps keep the ball in the pocket during play. The improved lacrosse head comprises an open frame having a base and a pair of sidewalls diverging from the base to form an interior surface. The interior surface of the sidewall includes a plurality of apertures along one side. A lip interconnects the sidewalls opposite the base and includes an exterior surface having a backlip portion and a frontlip portion. The backlip portion and frontlip portion in communication with the interior surface of the sidewall form the opening in the frame. The lip further comprises a plurality of apertures extending therethrough between the frontlip portion and the backlip portion. A plurality of laces are threadedly connected to the frame through the plurality of apertures on the interior surfaces of the sidewalls and the lip to form a pocket for receiving and carrying a ball.

One feature of the present invention is a pair of ridges formed on the lip portion and extending outwardly from the exterior surface of the lip to flank each lip aperture. The ridges are beveled in a decreasing dimension from the backlip portion to the frontlip portion. These ridges serve to protect the lacings from abrasive contact with the ground.

Another feature of the present invention is a plurality of depressions formed on the lip portion that extend inwardly from the interior surface of the lip. These depressions abut each aperture on the lip and are recessed in an increasing dimension from each aperture to the backlip portion. These depressions serve to protect the lacings from abrasive contact with the lacrosse ball.

An additional feature of the present invention includes a plurality of ball retaining ridges protruding from the interior surface of the sidewalls. Each ridge has an underside extending generally downwardly and outwardly toward the ball pocket and serves to direct and retain the ball within the pocket.

DETAILED DESCRIPTION OF THE PREFERRED EMBODIMENTS

Referring to FIGS. 1–4, there is shown a head for a lacrosse stick including the improvements of this invention. The head 20 preferably comprises an open frame 22 of monolithic injection molded plastic composition. The head may alternatively be formed from other methods besides injection molding and may also be formed of any other suitable material.

Figure 1:
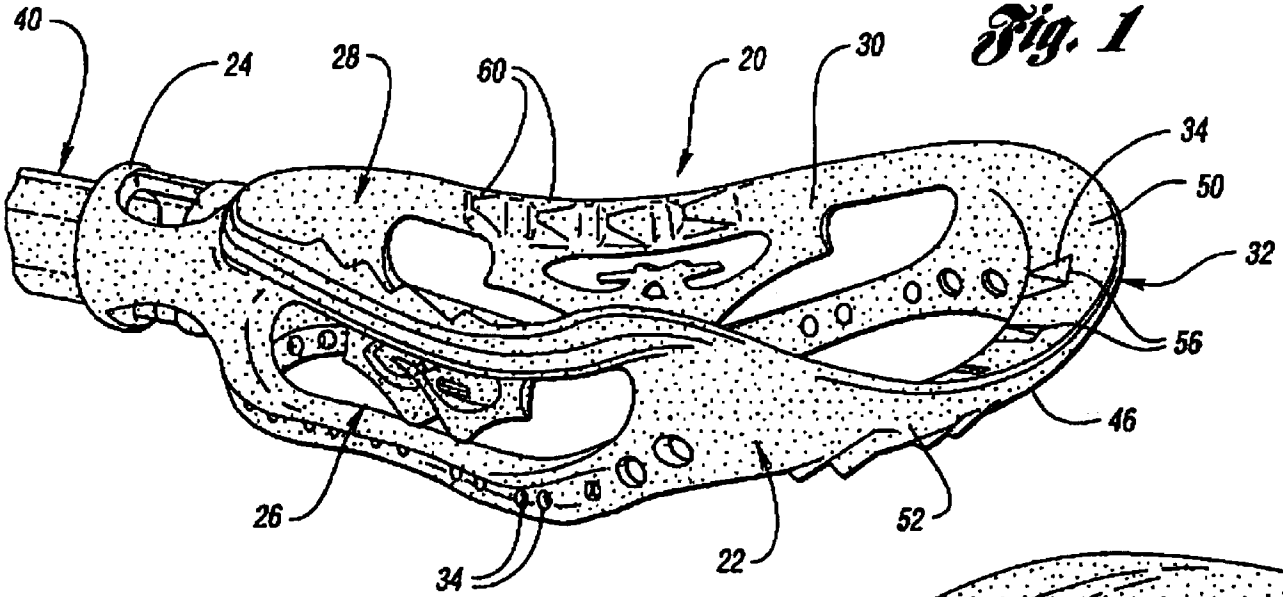
FIG. 1 is a perspective view of the improved lacrosse stick head in accordance with a preferred embodiment of the present invention.
Figure 2:
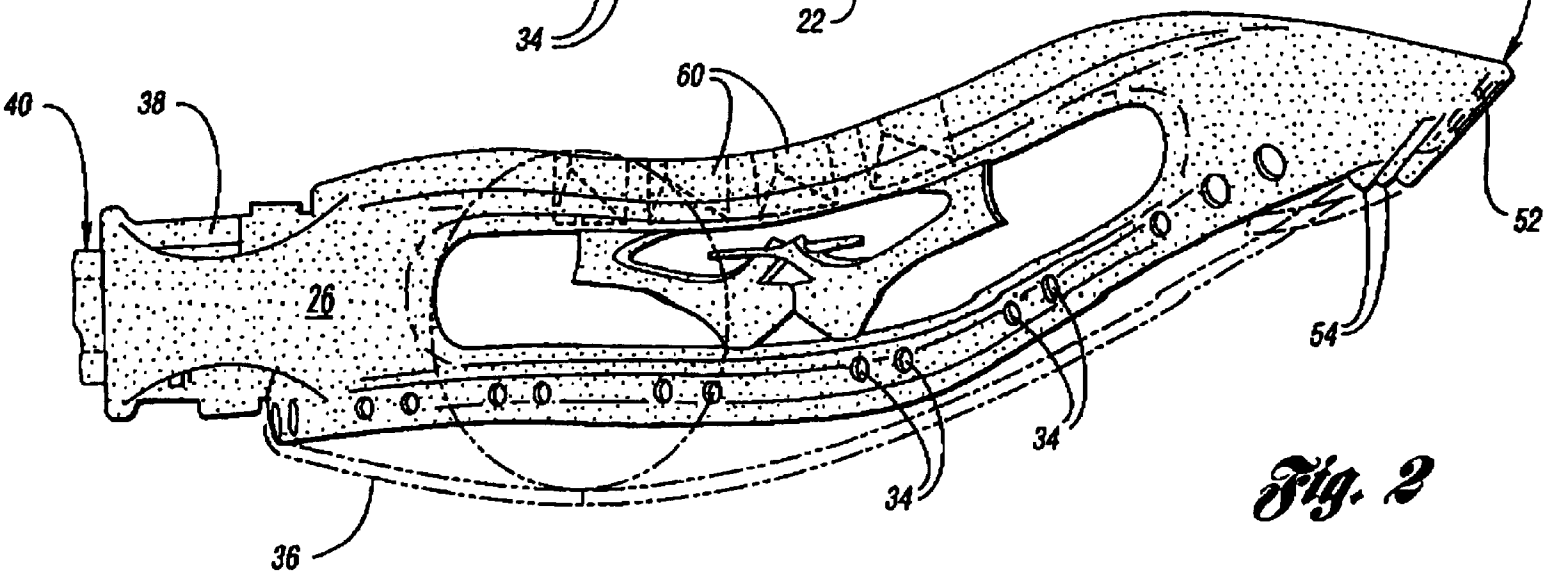
FIG. 2 is a side elevational view of the lacrosse head illustrated in FIG. 1.
Figure 3:
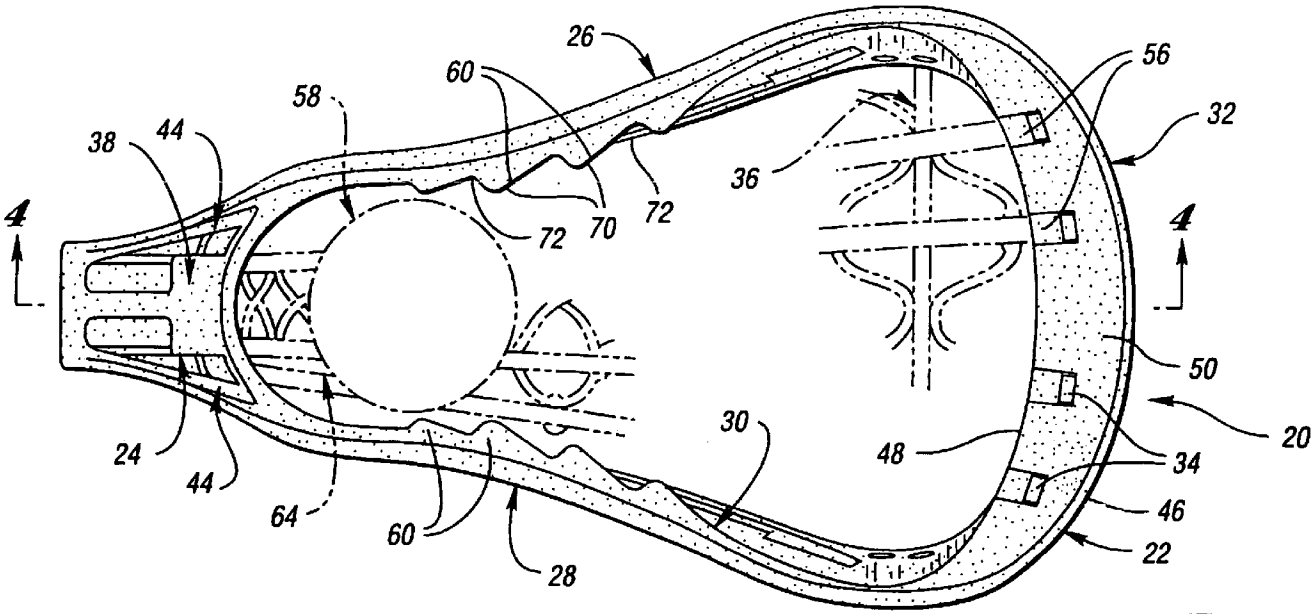
FIG. 3 is a top plan view of the lacrosse head illustrated in FIGS. 1 and 2 and illustrating a ball in the pocket.
Figure 4:
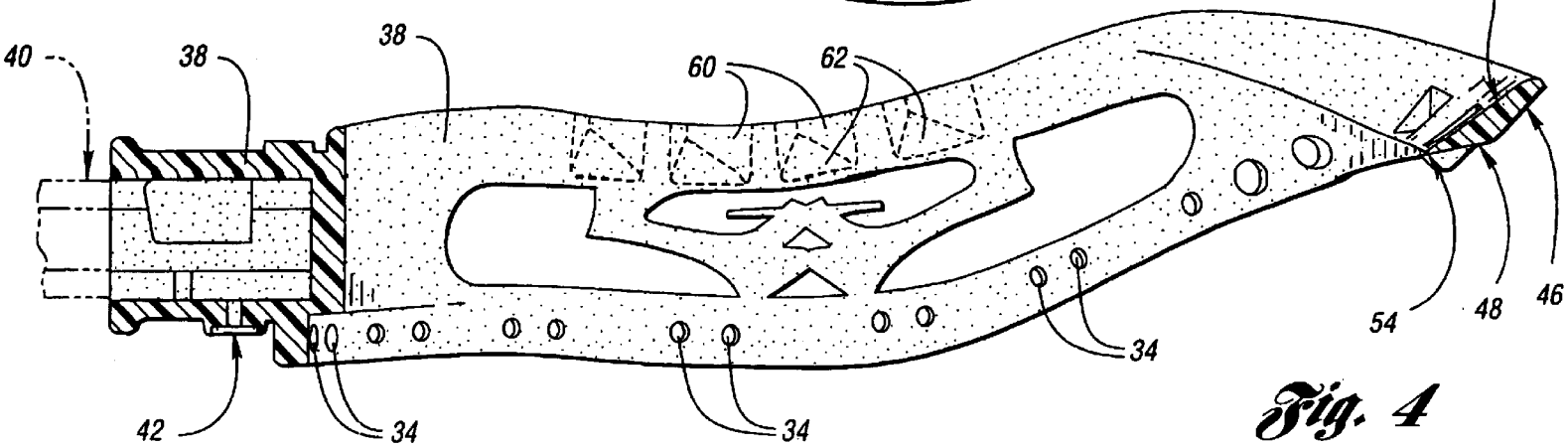
FIG. 4 is a sectional view of the lacrosse head taken substantially along line 4—4 in FIG. 3.

Frame 22 has a base 24 and a pair of sidewalls 26, 28 diverging from the base 24 to form an interior surface 30. The sidewalls 26, 28 are interconnected by an arcuate lip 32 at the ends thereof remote from the base 24. Sidewalls 26, 28 are of a diverging hourglass-like construction as shown in the plan view, being interiorly convex for about one-half of their lengths adjacent to lip 32. A series of apertures 34 is preferably disposed through each of the sidewalls 26, 28 along a backside thereof for securing a laced web thereto. Alternatively, the apertures 34 may be disposed entirely around frame 22. A socket 38 exteriorly projects from base 24 for receiving a lacrosse handle 40 (FIGS. 1–2 and 4). The handle 40 is preferably secured to the head 20 by a screw 42 (FIG. 4) or other suitable securing apparatus. A pair of ribs 44 integrally extend from associated sidewalls 26, 28 to the end of socket 38 remote from base 24 for strengthening the socket/frame interconnection.

The lip 32 includes a frontlip portion 46, a backlip portion 48, an interior surface 50, and an exterior lip surface 52. Lip 32 (FIG. 2) includes a plurality of ridges 54 extending outwardly from the exterior lip surface 52 to flank each one of the series of apertures 34 on the lip 32. The ridges 54 are beveled in a decreasing dimension from the backlip portion 48 to frontlip portion 46. These ridges 54 serve to protect the lacings of web 36 from abrasive contact with the ground which typically occurs while the head is being used to scoop up a ball. Preferably the apertures 34 along lip 32 are configured as quadrilaterals. This quadrilateral shape allows for better receipt of the laces therethrough as the laces are also of a quadrilateral shape.

A web 36 for receiving and carrying a lacrosse ball therein is preferably formed by stringing strips of leather in two directions. A plurality of strips are strung through the apertures 34 in the base 24 and the apertures 34 in the lip 22. A plurality of separate strips are strung through the apertures 34 in one sidewall 26 across to the other sidewall 28. A pocket is thus formed. The strips are preferably formed of leather, but may be of any other suitable material. Such stringing of the web is well known in the art.

Additionally, the lip 32 preferably includes a plurality of depressions 56 formed in the interior lip surface 50. Each depression 56 abuts each aperture 34 on lip 32 and extends generally inwardly. The depressions 56 are recessed in an increasing dimension from each of the apertures 34 to the backlip portion 48 and act as a protection for the lacings of the web 36 from abrasive contact with the lacrosse ball 58 which can occur while running with a ball in the pocket or while scooping a ball up off the ground.

Each sidewall 26, 28 is provided with a plurality of ball retaining ridges 60 (FIGS. 1–4) protruding from the interior surface 30 of sidewalls 26, 28. The ridges 60 are preferably integrally formed with the inner surface 30 of the sidewalls 26, 28. Each of the ridges 60 preferably includes an underside 62 that extends downwardly and outwardly toward the ball pocket 64. The ridges 60 are configured in this manner to direct the ball 58 towards the center of pocket 64 (FIG. 3) for better retention when the player is running or being checked and also to place the ball 58 in a better position for shooting the ball.

As shown in the Figures, the ridges 60 are generally arcuate or curved in shape when viewed from the top and have peaks 70 and valleys 72. Because of the configuration of the ridges 60, the peaks 70 are able to extend further inwardly towards the pocket allowing more of the underside 62 of the ridge 60 to contact the ball and keep it in the pocket.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed is:

1. A head for a lacrosse stick, comprising:

an open frame, having a base portion, a pair of sidewalls diverging from said base portion, and a lip interconnecting said pair of sidewalls opposite said base;

said lip having an interior surface, an exterior surface, a backlip portion, and a frontlip portion;

each of said pair of sidewalls having an exterior surface and an interior surface; and a plurality of ball retaining ridges formed on said interior surface of each of said pair of sidewalls*;*

[towards] *wherein each of said plurality of ball retaining ridges has an underside extending downwardly and outwardly away from said opposing sidewall.*

[2. The head for a lacrosse stick as recited in claim 1, wherein each of said plurality of ball retaining ridges has an underside extending downwardly and outwardly toward said opposing sidewall.]

3. The head for a lacrosse stick as recited in claim 1, wherein said lip has a plurality of apertures formed therein and opening on both said interior surface and said exterior surface.

4. The head for a lacrosse stick as recited in claim 3, wherein at least one of said plurality of apertures is a four-sided aperture.

5. The head for a lacrosse stick as recited in claim 4, further comprising a pair of ridges extending outwardly from said exterior surface of said lip and positioned around said at least one four-sided aperture.

6. The head for a lacrosse stick as recited in claim 5, wherein each of said pair of ridges is beveled in a decreasing dimension from said backlip portion to said frontlip portion.

7. The head for a lacrosse stick as recited in claim 3, wherein said interior surface of said lip has a plurality of recesses formed therein, associated with each of said plurality of apertures.

8. The head for a lacrosse stick as recited in claim 7, wherein said recesses increase in dimension from said aperture to said backlip portion.

9. A head for a lacrosse stick, comprising:

a base portion;

a pair of sidewalls diverging from said base portion and each having a plurality of apertures formed therein, said sidewalls each having an interior surface and an exterior surface;

a lip interconnecting said sidewalls opposite said base portion, said lip having a frontlip portion and a backlip portion;

an open frame defined by said base portion, said pair of sidewalls, and said lip;

a plurality of apertures formed through said lip;

a lace threadedly connected to said frame through said plurality of apertures in each of said pair of sidewalls and said plurality of apertures formed through said lip; and at least one ball retaining ridge formed on said interior surface of each of said sidewalls[toward], *wherein said at least one ball retaining ridge has an underside that extends generally downwardly and generally outwardly away from said opposing sidewall.*

[10. The head for a lacrosse stick as recited in claim 9, wherein each of said at least one ball retaining ridge has an underside that extends downwardly and outwardly toward said opposing sidewall.]

11. The head for a lacrosse stick as recited in claim 9, wherein each of said apertures in said lip has a bottom surface proximate to said backlip portion, said bottom surface of each of said apertures being generally planar.

12. The head for a lacrosse stick as recited in claim 11, wherein said apertures in said lip are four-sided apertures.

13. The head for a lacrosse sick as recited in claim 11, wherein a pair of ridges are positioned around said apertures in said lip, said pair of ridges extending generally outwardly from said exterior surface of said lip.

14. The head for a lacrosse stick as recited in claim 13, wherein each of said ridges are beveled in a decreasing dimension from said backlip portion to said frontlip portion.

15. The head for a lacrosse stick as recited in claim 9, wherein said interior surface of said lip has a plurality of recesses formed therein, associated with each of said lip apertures.

16. The head for a lacrosse stick as recited in claim 15, wherein said recesses increase in dimension from each of said apertures to said backlip portion.

*17. A head for a lacrosse stick, comprising:*

*an open frame, having a base portion, a pair of sidewalls diverging from said base portion, and a lip interconnecting said pair of sidewalls opposite base;*

*each of said sidewalls having an upper rim, a lower rim, and a middle portion between said upper rim and said lower rim, said sidewalls being divisible into a first half beginning adjacent said base portion and a second half terminating adjacent said lip;*

*a first distance defined between said upper rims of said sidewalls generally adjacent a midpoint of said sidewalls;*

*a second distance defined between said middle portions of said sidewalls generally adjacent a midpoint of said sidewalls;*

*said first distance being greater than said second distance.*

*18. A head for a lacrosse stick, comprising:*

*an open frame, having a base portion, a pair of sidewalls diverging from base portion, and a lip interconnecting said pair of sidewalls opposite said base;*

*each of said sidewalls having an upper rim, a lower rim, and a middle portion between said upper rim and said lower rim, said sidewalls having a first half adjacent said base and a second half adjacent said scoop;*

*a first distance defined between said upper rims of said sidewalls;*

*said first distance being greater than said second distance along substantially said entire second half of said sidewalls.*

*19. The head of claim 17, wherein said upper rim of each of said sidewalls has a portion therein that curves generally downwardly with respect to an upper surface of said base portion.*

*20. The head of claim 17, wherein said upper rim of each of said sidewalls curve generally downwardly with respect to an upper surface of said base portion beginning adjacent said base portion.*

*21. The head of claim 17, wherein said upper rim of each of said sidewalls has a portion that extends generally downwardly with respect to an upper surface of said base portion.*

*22. The head of claim 17, wherein said upper rim of each of said sidewalls extends generally downwardly with respect to an upper surface of said base portion beginning adjacent said base portion.*

*23. The head of claim 17, wherein said upper rim of each of said sidewalls has a portion that is located downwardly with respect to an upper surface of said base portion.*

*24. The head of claim 17, wherein each of said sidewalls have a plurality of openings formed therein that are not intended to receive a netting therethrough.*

*25. The head of claim 17, further comprising:*

*at least one ball retaining ridge formed on said interior surface of each of said pair of sidewalls.*

*26. The head of claim 25, wherein each of said at least one ball retaining ridges extends generally inwardly from said interior surface toward said opposing interior surface.*

*27. The head of claim 25, wherein each of said at least one ball retaining ridge is formed adjacent said upper rim of said respective sidewall.*

*28. The head of claim 25, wherein each of said at least one ball retaining ridge has an underside that extends generally downwardly with respect to said upper rim and generally inwardly away from said opposing interior surface.*

*29. The head of claim 18, wherein said upper rim of each of said sidewalls has a portion that curves generally downwardly with respect to an upper surface of said base portion.*

*30. The head of claim 18, wherein said upper rim of each of said sidewalls curve generally downwardly with respect to an upper surface of said base portion beginning adjacent said base portion.*

*31. The head of claim 18, wherein said upper rim of each of said sidewalls has a portion that extends generally downwardly with respect to an upper surface of said base portion.*

*32. The head of claim 18, wherein said upper rim of each of said sidewalls extends generally downwardly with respect to an upper surface of said base portion beginning adjacent said base portion.*

*33. The head of claim 18, wherein said upper rim of each of said sidewalls has a portion that is located downwardly with respect to an upper surface of said base portion.*

*34. The head of claim 18, wherein each of said sidewalls have a plurality of openings formed therein that are not intended to receive a netting therethrough.*

*35. The head of claim 18, further comprising:*

*at least one ball retaining ridge formed on said interior surface of each of said pair of sidewalls.*

*36. The head of claim 35, wherein each of said at least one ball retaining ridges extends generally inwardly from said interior surface toward said opposing interior surface.*

*37. The head of claim 35, wherein each of said at least one ball retaining ridge is formed adjacent said upper rim of said respective sidewall.*

*38. The head of claim 35, wherein each of said at least one ball retaining ridge has an underside that extends generally downwardly with respect to said upper rim and generally inwardly away from said opposing interior surface.*

*39. A head for a lacrosse stick, comprising:*

*an open frame having a base with a concave interior surface defining a ball rest, a pair of sidewalls diverg-*

*ing from said base and a lip interconnecting said sidewalls remotely of said base;*

*a plurality of apertures carried by said frame for securing a lacrosse net along a back side of said frame, leaving the front side of said frame open for receiving a lacrosse ball;*

*a socket extending from said base for attachment of a handle so as to define a handle/head axis, said socket having an upper surface defining a plane parallel to said handle/head axis;*

*each of said sidewalls having an upper rim, a middle portion, and a lower rim, each of said sidewalls having a first half beginning at said base and a second half terminating at said lip; and*

*wherein each of said sidewalls slopes generally outwardly away from said handle/head axis from said lower rim to said upper rim along substantially said entire second half of each of said sidewalls.*

*40. The head of claim 39, wherein at least a portion of each of said upper rims is spaced further outwardly from said handle/head axis than a corresponding portion of said lower rim of each of said sidewalls.*

*41. The head of claim 39 wherein each of said sidewalls has a first half adjacent said base and a second half adjacent said lip and wherein at least a portion of said upper rims is spaced further outwardly from said handle/head axis than a corresponding middle portion of each of said sidewalls in said second half.*

*42. The head of claim 41, wherein said upper rims are spaced further outwardly from said handle/head axis than said middle portion throughout said second half.*

*43. The head of claim 41, further comprising:*

*at least one opening formed in each of said sidewalls, which is separate from said plurality of apertures and is not intended to receive any portion of said lacrosse net therethrough.*

*44. The head of claim 41, wherein said at least one opening is formed in at least said middle portion of each of said sidewalls.*

*45. The head of claim 39, wherein each of said sidewalls has a first portion and a second portion with said first portion being located above said second portion and being spaced more outwardly from said handle/head axis than said first portion.*

*46. A lacrosse head for attachment to a lacrosse stick, comprising:*

*a first element defining an open area for receiving a lacrosse ball and being broadly divisible into a rear portion and a forward portion, said frame element including:*

*a base;*

*a scoop located opposite said base;*

*a socket extending from said base for attachment of a handle so as to define a handle/head axis, said socket having an upper surface defining a plane parallel to said handle/head axis;*

*a pair of diverging sidewalls extending from said base to said scoop;*

*at least one ball retention mechanism formed in each of said pair of sidewalls; and*

*a catching area defined by an upper rim of said base and said pair of sidewalls and a pocket area defined by a lower portion of said base and a lower portion of said pair of sidewalls;*

*wherein said catching area is larger than said pocket area and wherein each of said sidewalls slopes outwardly from said handle/head axis at at least one location in said forward portion.*

*47. A head for attachment to a lacrosse stick comprising:*

*an open frame, having a base portion, a pair of sidewalls diverging from said base portion, and a lip interconnecting said pair of sidewalls opposite said base;*

*said lip having an interior surface, an exterior surface, a backlip portion, and a frontlip portion;*

*each of said pair of sidewalls having an exterior surface and an interior surface; and*

*a plurality of ball retaining ridges formed on said interior surface of each said pair of sidewalls, wherein each of said ball retaining ridges has an underside that extends towards said opposing sidewall in an orientation non-perpendicular to said interior surface.*

*48. A lacrosse head for attachment to a lacrosse handle, comprising:*

*an open frame, having a base portion, a pair of sidewalls diverging from said base portion, a lip interconnecting said pair of sidewalls opposite said base and a socket extending rearwardly from said base;*

*said sidewalls having an upper rim and a lower rim and at least a portion of said upper rims of said sidewalls defining a plane generally parallel to an upper surface of said socket;*

*each of said pair of sidewalls having an upper rim and a lower rim; and*

*a plurality of ball retaining ridges formed adjacent said upper rim adjacent each of said pair of sidewalls; each of said ball retaining ridges extending generally toward said opposing sidewall and having a portion extending generally away from said plane.*

*49. The lacrosse head of claim 48, wherein said sidewalls have a generally curved configuration.*

*50. The lacrosse head of claim 48, wherein said ball retaining ridges extend generally downward with respect to said plane.*

*51. The lacrosse head of claim 48, further comprising:*

*a plurality of sidewall openings formed in each of said sidewalls which are not intended to receive a netting therethrough.*

*52. A plastic lacrosse head for attachment to a lacrosse stick, comprising:*

*an open frame, having a base portion, a pair of sidewalls diverging from said base portion, a scoop interconnecting said pair of sidewalls opposite said base and a socket extending rearwardly from said base;*

*said sidewalls having an upper rim and a lower rim and at least a portion of said upper rims of said sidewalls defining a plane generally parallel to an upper surface of said socket;*

*each of said pair of sidewalls having an upper portion and a lower portion, said upper portion of said sidewalls defines a first distance therebetween and said lower portions of said sidewalls defines a second distance therebetween, wherein at least one location along said frame said first distance is greater than said second distance; and*

*a ball retention mechanism formed in each of said sidewalls to assist in retaining a lacrosse ball in the head.*

*53. The lacrosse head of claim 52, wherein said ball retention mechanism is located adjacent said upper portions of each of said sidewalls.*

*54. The lacrosse head of claim 52, wherein each of said sidewalls includes an upper rim and a lower rim.*

*55. The lacrosse head of claim 54, wherein said upper rim of each of said sidewalls has a portion that curves generally downwardly with respect to an upper surface of said base portion.*

*56. The lacrosse head of claim 54, wherein said upper rim of each of said sidewalls curves generally downwardly with respect to an upper surface of said base portion beginning adjacent said base portion.*

*57. The head of claim 54, wherein said upper rim of each of said sidewalls has a portion that extends generally downwardly with respect to an upper surface of said base portion.*

*58. The head of claim 54, wherein said upper rim of each of said sidewalls extends generally downwardly with respect to an upper surface of said base portion beginning adjacent said base portion.*

*59. The head of claim 54, wherein said upper rim of each of said sidewalls has a portion that is located downwardly with respect to an upper surface of said base portion.*

*60. The head of claim 54, wherein each of said sidewalls has a plurality of openings formed therein that are not intended to receive a netting therethrough.*

*61. The head of claim 52, wherein said ball retaining mechanism includes at least one ball retaining ridge formed on an interior surface of each of said pair of sidewalls.*

*62. The head of claim 61, wherein each of said at least one ball retaining ridges extends generally inwardly from said interior surface toward said opposing interior surface.*

*63. The head of claim 52 wherein said frame is broadly divisible into a forward portion and a rear portion and wherein said first distance is greater than said second distance in said forward portion.*

*64. A plastic lacrosse head for attachment to a lacrosse stick, comprising:*

*an open frame including a base portion, a pair of sidewalls diverging from said pair of sidewalls opposite said base and a socket extending rearwardly from said base;*

*a catching area defined by an upper portion of said base portion and an upper portion of each of said pair of sidewalls;*

*a pocket area defined by a lower portion of said base portion and a lower portion of each of said pair of sidewalls; and*

*a plurality of ball retention mechanisms formed on each of said sidewalls to assist in keeping a lacrosse ball in the head;*

*wherein said catching area is greater than said pocket area.*

* * * * *